United States Patent [19]

Staufer

[11] 4,359,077
[45] Nov. 16, 1982

[54] PROCESS AND APPARATUS FOR FORMING A PROFILED TREAD SURFACE ON A SKI

[75] Inventor: Adolf Staufer, Ried im Innkreis, Austria

[73] Assignee: Fischer Gesellschaft m.b.H., Ried im Innkreis, Austria

[21] Appl. No.: 231,370

[22] Filed: Feb. 3, 1981

Related U.S. Application Data

[62] Division of Ser. No. 36,807, May 7, 1979, Pat. No. 4,268,059.

[30] Foreign Application Priority Data

Jul. 20, 1978 [AT] Austria ................................. 5280/78
Nov. 30, 1978 [AT] Austria ................................. 8556/78

[51] Int. Cl.³ .............................................. B27M 1/00
[52] U.S. Cl. ..................................... 144/371; 280/604
[58] Field of Search ........... 280/604; 144/2 R, 117 R, 144/134 R, 136 R, 172, 173, 174, 218, 230, 323, 326 R

[56] References Cited

U.S. PATENT DOCUMENTS

| 2,143,545 | 1/1939 | Currier | 280/604 |
| 2,437,668 | 3/1948 | Adams | 144/136 R |
| 3,408,086 | 10/1968 | Bennett | 280/604 |
| 4,118,050 | 10/1978 | Schnurrenberger | 280/604 |
| 4,178,012 | 12/1979 | Roth et al. | 280/604 |

FOREIGN PATENT DOCUMENTS

| 291063 | 6/1971 | Austria | 280/604 |
| 978219 | 11/1975 | Canada | 280/604 |
| 2142271 | 3/1973 | Fed. Rep. of Germany | 280/604 |
| 2346235 | 12/1977 | Fed. Rep. of Germany | 280/604 |
| 2621490 | 12/1977 | Fed. Rep. of Germany | 280/604 |
| 808359 | 11/1936 | France | 280/604 |
| 2066588 | 9/1964 | France | 280/604 |
| 2227884 | 9/1972 | France | 280/604 |
| 2326213 | 12/1972 | France | 280/604 |
| 75057 | 10/1917 | Switzerland | 280/604 |
| 475771 | 10/1947 | Switzerland | 280/604 |
| 579932 | of 0000 | Switzerland | |

Primary Examiner—W. D. Bray
Attorney, Agent, or Firm—Fleit & Jacobson

[57] ABSTRACT

In a process of forming a profiled tread surface on a ski, a cutting tool is moved in steps of defined length in the longitudinal direction of the tread surface to be profiled and in steps of defined length transversely to said longitudinal direction. The cutting tool thus moved is used to form said tread surface with individual recesses, which partly overlap and are defined by sawtooth-shaped step ramps extending in said longitudinal direction. Adjacent transverse rows of said recesses overlap preferably by one-half of the length of each of said transverse steps.

3 Claims, 15 Drawing Figures

PROCESS AND APPARATUS FOR FORMING A PROFILED TREAD SURFACE ON A SKI

This is a divisional of Application Ser. No. 36,807, filed May 7, 1979, now U.S. Pat. No. 4,268,059, issued May 19, 1981.

SUMMARY OF THE INVENTION

In a process of forming a profiled tread surface on a ski, a cutting tool is moved relative to said tread transversely to the longitudinal direction of the ski and is used to form said tread surface with successive recesses aligned in rows that extend transversely to the longitudinal direction of the ski. These recesses have the shape of sawtoothlike step ramps and gradually terminate toward the rear end of the ski. The cutting tool is then shifted in the longitudinal direction of the ski by the width of at least one transverse row and is subsequently used to form additional recesses in rows extending transversely to the ski. The recesses in adjacent transverse rows are staggered in the transverse direction by a fractional part of the length of each step performed in the transverse direction and overlap in the longitudinal direction by a fractional part of the length of each step performed in the longitudinal direction.

The invention relates to a process of forming a profiled surface on an elongated member, particularly to a process of forming a profiled surface on a plastic tread of a member which is intended to slide on another surface.

The invention relates also to apparatus for carrying out the process.

Finally the invention relates to a ski which has a surface formed by the process according to the invention.

It is known that the tread of a ski, particularly of a cross-country ski, can be provided with a step profile so that a sliding back of the ski is avoided or rendered more difficult. Such profiled surface has profile elements which on one side rise relatively gradually in the direction from the forward end of the ski toward the rear end thereof, and on the other side have a steep, preferably vertical end face. When the ski is loaded, that profile element, which is sawtooth-shaped in the longitudinal direction, is forced into the snow and acts like a tooth, which presents a much lower resistance to a forward sliding movement than to a rearward sliding movement. That effect is regarded as optimum if the profile elements can transmit rearwardly a tangential force which is sufficient for a push in a diagonal step whereas a maximum slidability in the forward direction is preserved. The action of such climbing aids depends highly on the condition of the snow track. In hard, frozen tracks such climbing aids often do not permit of a satisfactory push and in soft tracks the slidability is only poor. The effect can be influenced within limits by a change of the size of the profiled surface but the shape and design of the profile elements is highly significant too.

The simplest profile elements consist of sawtooth-shaped transverse steps, which have straight edges and have approximately the same depth throughout the width of each step. Because such steps tend to cause chattering, they are often given the shape of an arrow or arranged to cross each other. A quieter movement can allegedly also be promoted by steps having a curbed edge.

It is also known to mill crescent-shaped recesses into the tread by end mills which have an axis that is inclined some degrees from the normal on the surface, and to cut the negative form of such recesses by such end mills into an embossing plate, which is then used to impress the recesses into the tread. When such individual steps having a diameter which is only a fractional part of the width of the ski are arranged in rows, the resulting patterns are similar to the scales of fish or to roofing tiles, particularly if successive rows are staggered from each other (Austrian Patent Specificaton No. 291,063, now U.S. Pat. No. 3,408,086). A disadvantage of such patterns resides in that particularly the acute-angled intersections of the edges of the steps tend to be covered with ice so that the push becomes less effective.

It is an object of the invention to avoid that disadvantage and to improve the relationship of push to slidability under all snow conditions.

In accordance with the invention, a cutting tool is caused to cut into the surface to be profiled and is displaced in steps having a defined length in the transverse direction of the surface and in steps having a defined length in the longitudinal direction of the surface. Individual recesses are thus formed, which extend in the tranverse direction and which partly overlap and are sawtooth-shaped in the longitudinal direction. Preferably two adjacent transverse rows of said recesses are staggered preferably by one-half of the extent of each step in the transverse direction. Alternatively, an embossing tool may be machined to present the negative form to such recesses and is then used to emboss the recesses into the surface of the member in an operation in which the member is moved relative to the tool.

Certain advantages are afforded by the profiled surface formed in accordance with the invention, whether the profiled surface has been formed directly by a cutting tool or by an embossing operation with an embossing tool which has been profiled by a cutting tool.

The cutting tool rotates preferably about an axis which is at right angles to the direction of the relative movement between the surface and the cutting tool. If the cutting edges of the cutting tool are properly designed, that operation can be used to form overlapping successive recesses, which may have the shape of a parabola, hyperbola, triangle or beaver's tail or a similar shape and which together constitute a scale pattern.

In carrying out the process according to the invention, a rotating cutting tool is used which is arranged so that its axis lies in a plane which is normal to the surface and parallel to the longitudinal axis of the surface. That cutting tool has a cutting edge which is inclined by up to 5° to the surface. The radius of the cutting circle of the cutting edge, the inclination of the cutting edge relative to the surface and the profile of the cutting edge are so selected that in a fixed position relative to the surface the cutting tool is operable to form in said surface a recess which is sawtooth-shaped in its longitudinal direction and has a depth that varies across the width thereof in dependence on the radius of the cutting circle. Said recess intersects the original surface along a line having a typical configuration.

A member, such as a ski, which has been shaped in accordance with the process of the invention has a profiled surface which has longitudinally extending, sawtooth-shaped step ramps, which in transverse section rise along a gentle curve to their maximum height and then decline also gradually.

Further details of the invention will be explained more fully with reference to the accompanying drawings, in which illustrative embodiments of scale patterns and of the apparatus for forming the same are shown.

Figure 1:
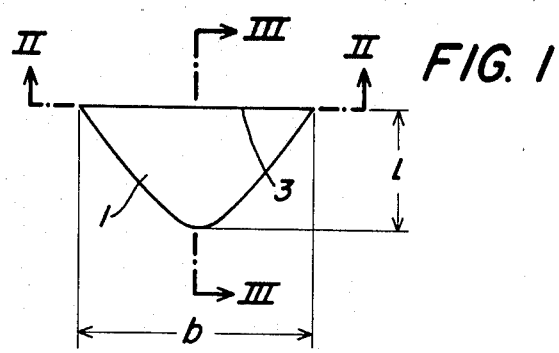
FIG. 1 is a top plan view showing an embodiment of a single recess.
Figure 2:
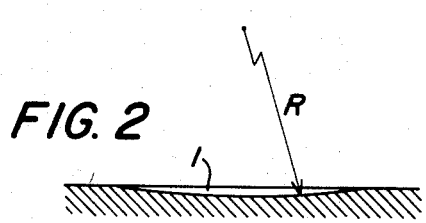
FIG. 2 is a sectional view taken on line II—II in FIG. 1.
Figure 3:
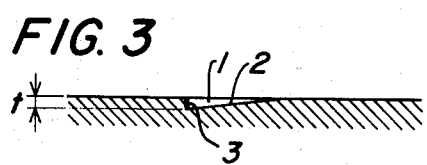
FIG. 3 is a sectional view taken on line III—III in FIG. 1.

One of the recesses of the profiled surface is designated 1 in FIGS. 1 to 3 of the drawings. The shape of said recess and of the entire profiled surface depends on the shape of the cutting tool, the angular spacing of the teeth thereof, the feed rate of the surface moving under the cutting tool, and the overlap of adjacent rows of recesses.

The radius R of the cutting circle of the cutting tool is so selected that a step having a desired depth t is obtained by a cut in a desired width b. For instance, if the width b equals 20 mm and a depth t of 0.3 mm is desired, a cutting circle having a radius of 166.7 mm will be required. The length l of the recess can be coordinated with the depth t by the selection of the inclination of the cutting edge from the original surface. For instance a tool having straight cutting edges will cut a recess having a length l of 10 mm and a depth t of 0.3 mm if the cutting edges have an inclination of 1.7°.

If the gently rising ramp 2 of the recess shown in FIG. 3 is formed by cutting with a straight cutting edge, the recess will intersect the original surface along the hyperbola indicated in FIG. 1. If the cutting tool is ground in a suitable manner to have a convex cutting edge in the longitudinal direction of the recess, the line of intersection will approximate an arc of a circle. The use of a concavely ground cutting edge will result in a convex ramp and will enable the formation of triangular intersections.

In accordance with the invention, the profiled surface is formed in that the cutting tool which has acted on the surface is moved in defined steps having a length $D_Q$ in the transverse direction of the surface and in defined steps having a length $D_L$ in the longitudinal direction of the surface. Successive transverse rows of recesses are thus formed in such a manner that adjacent transverse rows are offset by a distance $V_R$, which is preferably as large as one-half of $D_Q$, and that adjacent recesses overlap so that they intersect at extremely obtuse angles. The design of the profiled surface will now be explained more fully with reference to FIGS. 4 to 8.

Figure 4:
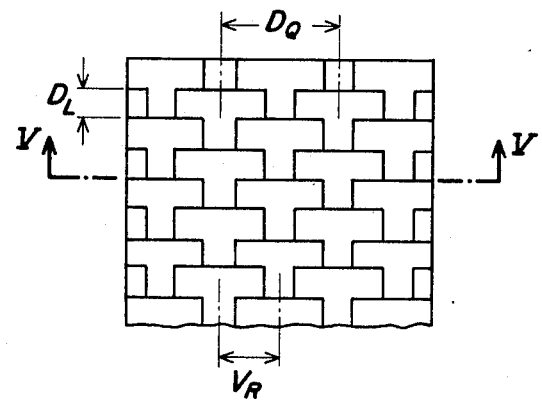
FIG. 4 shows a profiled tread surface of a ski.

FIG. 4 shows a profiled surface that has been formed in a process in which the following variables were used:

Radius R of cutting circle—201.6 mm
Inclination of cutting edges—1.7°
Width of cut b—22 mm
Length of cut l—10 mm
Depth of cut t—0.3 mm
Length of transverse step $D_Q$—20 mm
Length of longitudinal step $D_L$—5 mm
Transverse offset $V_R$—10 mm ($=D_Q/2$)
Cutting edge of cutting tool—straight.

Figure 5:
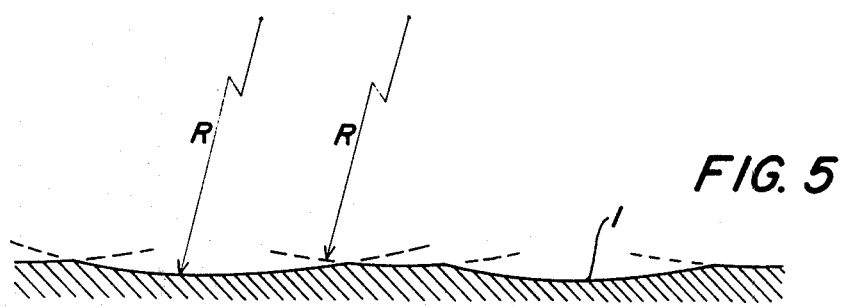
FIG. 5 is a sectional view taken on line V—V in FIG. 4.

This operation results in T-shaped lines of intersection. The original surface disappears entirely and the profiled surface consists only of the cut surfaces which define the several recesses. Alternatively, the process variables can be altered so that a profiled surface is formed in which residual portions of the original surface remain. The profiling according to the invention results in sawtooth-shaped step ramps, which in transverse section rise along a gentle curve to their maximum height and then decline also gently. FIG. 5 shows the profiled surface of FIG. 4 in a transverse sectional view taken along line V—V. It is clearly apparent that adjacent steps are separated by a shallow arcuate depression. The lines of intersection between adjacent step ramps are so gentle that no snow or ice can deposit on the ramps. Rather than cutting discrete recesses, this operation results in steps which rise from the base.

Figure 6:
FIG. 6 shows the transverse sectional shape of a profiled surface which has been embossed by means of an embossing tool which has a pattern that is similar to that shown in FIGS. 4 and 5.

FIG. 6 is a transverse sectional view showing a profiled surface which has been embossed by an embossing tool which has a pattern that is similar to that shown in FIGS. 4 and 5. Whereas the profiled surface is the negative form here, the steps are separated by similarly shallow recesses, which intersect at extremely obtuse angles. The profile shown in FIG. 6 differs from that of FIG. 5 in that the steps rise to their maximum height in a convex curve.

Figure 7:
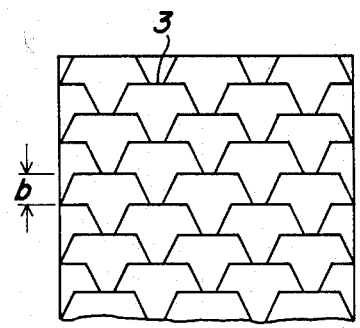
FIGS. 7 and 8 show profiled surfaces which differ from that shown in FIG. 4.
Figure 8:
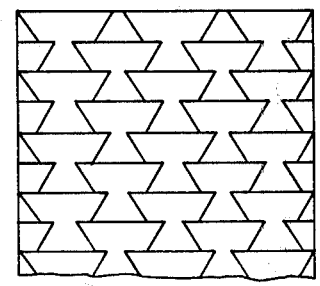

FIG. 7 shows a profiled surface which has been made by a cutting tool having slightly convex cutting edges whereas the other process variables were the same as those used to obtain the profiled surface of FIG. 4. In FIG. 7, each recess intersects the plane surface approximately along an arc of a circle rather than a hyperbola. As a result, the lines of intersection are not parallel to the longitudinal axis but converge so that a crownlike overall pattern is obtained. FIG. 8 shows a profiled surface which has been made by a cutting tool having slightly concave cutting edges whereas the other process variables were the same as those used to obtain the profiled surface of FIG. 4. In that case each recess intersects the plane surface approximately in the configuration of a triangle rather than a hyperbola so that the lines of intersection are not parallel to the longitudinal axis, as in FIG. 4, but diverge at an angle and the resulting pattern is inverse to the crown pattern of FIG. 7.

The technical differences between the profiled surfaces shown in FIGS. 4, 7 and 8 reside in that the step edges which enter the track under load differ in length so that the edges of adjacent transverse rows overlap more or less. That overlap is smallest in the profiled surface shown in FIG. 7 and largest in the profiled surface shown in FIG. 8. In that way, the push effect can be influenced by the selection of the generatrix of the cutting tool. To form the profiled surface, the cutting tool is rotated and the surface to be profiled is fed transversely to the axis of rotation of the shaft of the cutting tool, which engages the surface at the entrance end thereof. In this way depressions are formed in a row which extends in the feeding direction, which is transverse to the longitudinal direction of the surface. When the depressions of that row have been completed, the surface is shifted in its longitudinal direction, transversely to the row of depressions which have been formed, to an extent that is equal to the length of one depression less the extent of the desired overlap. The depressions of the next row are then formed, which are staggered relative to the preceding row, e.g., by one-half the width of each depression. That operation is repeated until the entire surface to be profiled exhibits the scale pattern formed by the depressions, which are inclined from the surface and from said surface gradually decline forwardly, toward the forward end of the ski, until they terminate at an end face 3, which extends along an arc of a circle.

The cutting tool may consist of, e.g., a rotary knife, a milling cutter, or a boring bar.

Figure 10:
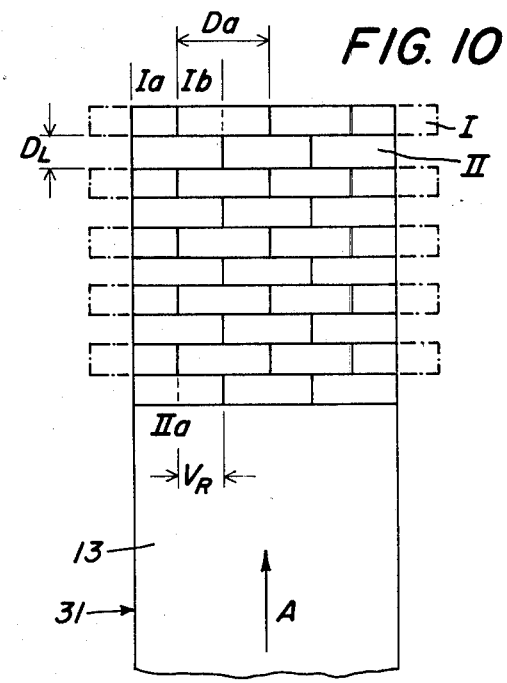
FIG. 10 is a simplified showing of a pattern that is similar to that of FIG. 4.

For the subsequent explanation of the several embodiments of apparatus according to the invention, reference is made to FIG. 10, which is a simplified representation of the patterned or profiled surface, in which the cross-pieces of the adjacent T-shaped figures have been extended so that they adjoin each other and cover the legs of the preceding T-shaped figures. In that pattern, the transverse rows of depressions of one group are designated I and those of the group which is staggered therefrom are designated II.

Figure 9:
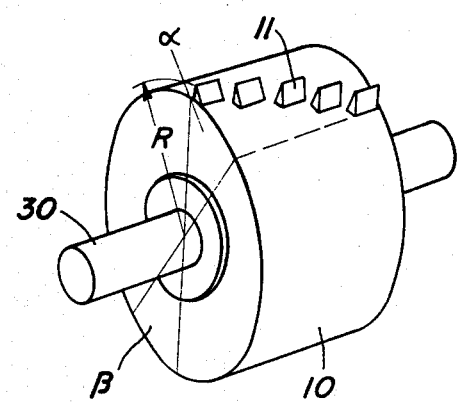
FIG. 9 is a perspective view showing a milling cutter for use according to the invention.

The tool shown in FIG. 9 comprises a cylindrical cutter body 10, which is provided with two sets of teeth 11. These sets of teeth are secured to the peripheral surface of the cylindrical cutter body in respective diametrically opposite sectors $\alpha$ and $\beta$. The teeth of each set are closely spaced apart in the peripheral and axial directions of the cylindrical cutter body. The axial center spacing of adjacent teeth is equal to the spacing $D_L$ of two rows of longitudinally aligned depressions, i.e., of two rows I or two rows II. The teeth of one set are axially offset from those of the other by a distance which in the present case equals $V_R = D_Q/2$. In operating positions, the axis of the shaft 30 of the cylindrical cutter body 10 extends in the longitudinal direction of the surface to be machined; in the present case that axis is parallel to the edge of the ski.

Figure 11:
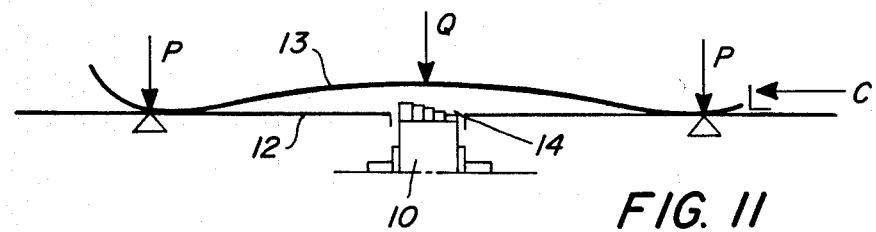
FIG. 11 is a diagrammatic representation of a plant which serves to machine the tread surface of a ski and is provided with the tool according to the invention.

The mode of operation of the tool consisting of the cylindrical cutter body 10 and the teeth 11 will now be explained with reference to FIG. 11. A ski 13, e.g., a cross-country ski, is fixed to a table 12 by the action of a force Q applied in the binding area and a force P applied to each end portion of the ski. The table 12 is formed with an aperture 14, through which the tread surface of the ski 13 is accessible for the cutting tool 10, 11. That tool is engaged with the tread surface so that teeth of one set can begin to machine the tread surface at one side edge thereof. It may be assumed that the teeth arranged in the sector begin to cut the depressions of rows I in the direction from left to right. In that case, the first recess of each transverse row I is cut. Because there are five teeth in the sector $\alpha$, the recesses of five transverse rows are cut at the same time. It is apparent from FIG. 10 that only a half-recess of the first longitudinal row Ia is cut during the first cut. As the cutting tool 10, 11 is rotated, the teeth arranged in the sector $\beta$ act on the tread surface and cut the recesses of the first longitudinal row IIa of the recesses II, which are staggered from the recesses of the row Ia by the distance $V_R = D_Q/2$. To cut the recesses of the second longitudinal row Ib of the rows I, the cutting tool 10, 11 must be moved by a step of the order of the offset $V_R$. Thereafter the teeth arranged in the sector cut the recesses of the longitudinal row 1b.

These operations are repeated in alternation until the cutting tool has machined the surface throughout its width. The ski together with its fixing means is then advanced in the longitudinal direction A to an extent which is equal to the length of the machined pattern section. To that end, a force C is exerted on the rear portion of the ski. The next pattern section is then machined in the manner which has been described. Successive pattern sections are machined until the tread surface has been patterned entirely or throughout the area which is to be patterned.

It will be understood that a plurality of juxtaposed skis can be fixed and can be machined in succession in that the cutting tool travels step by step over the tread surfaces of all skis in a common operation.

The use of the tools according to the embodiments of the invention which will be described hereinafter eliminates the need for feeding the cutting tool transversely to the longitudinal direction of the ski.

Figure 12:
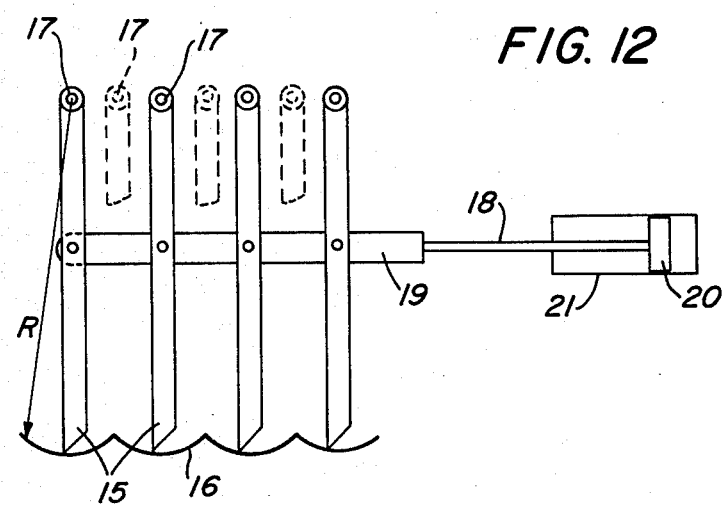
FIG. 12 is a side elevation showing a second embodiment of apparatus according to the invention.
Figure 13:
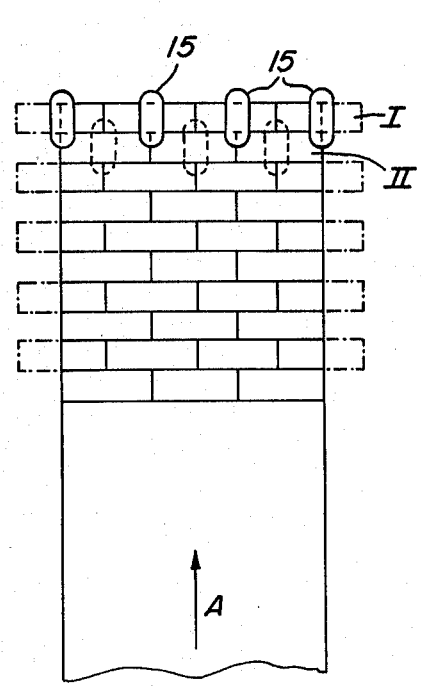
FIG. 13 is a top plan view showing how the knives of the apparatus of FIG. 12 are arranged over a simplified pattern as shown in FIG. 10

The tool shown in FIGS. 12 and 13 comprises striking knives 15, which are arranged in two staggered rows and pivotally suspended. The knives in each row are equal in number to the recesses in each row. To prevent an interference between knives, the longitudinal spacing of the rows of knives is such that the staggered knives cut the recesses of the next but one staggered row. In the present case, one row of recesses comprises two complete recesses and at opposite edges two one-half recesses, and the staggered row of recesses comprises three complete recesses, as shown in FIG. 10, and there are seven knives, four of which are arranged in one row and three in the other. The rows of knives are spaced a distance $2D_L$ apart so that the knives of one row cut the recesses of one row I and the knives of the other row cut the recesses of the next but one staggered row II at the same time.

After each cut, the ski or, all juxtaposed skis which are machined at the same time by a suitable number of knives, is or are advanced in the longitudinal direction of the ski or skis, indicated by the arrow A, in the present case by the distance $D_L$.

The striking knives 15 of each row are connected approximately at their length center by a common beam 19 and at their ends remote from the knife edges 16 are pivoted by respective shoes on respective pivots 17. The beams 19 associated with both rows are connected to a piston rod 18, which is connected to a piston 20, which is moved in a hydraulic or pneumatic cylinder 21. For the sake of clearness, only the knives of one row are shown in FIG. 7. The intervening knives of the staggered row are indicated by their pivots 17.

Figure 14:
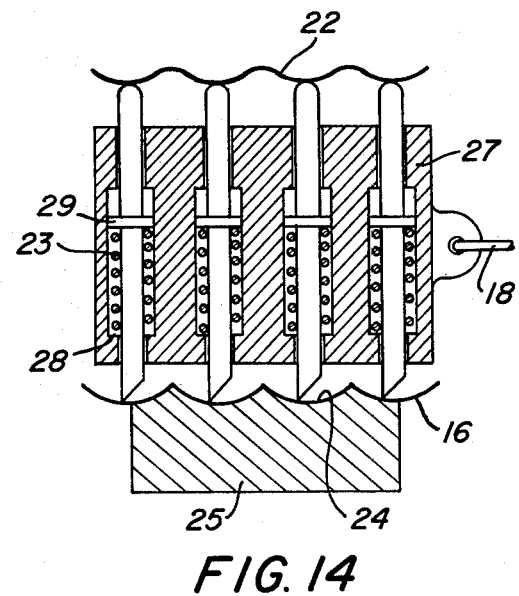
FIG. 14 is a side elevation showing a modification of the apparatus of FIG. 12.

The apparatus shown in FIG. 14 is similar to that of FIG. 12 but differs therefrom in that the cutting movement is imparted to the striking knives 15 by a template 22, which overcomes the force of return springs 23 to force the knives 15 against the surface 24 which is to be profiled and belongs to the ski 25. The knives are guided in a housing 27, in which the return spring 23 that is associated with each knife bears on a seat 28 of the housing and on a collar 29 of the knife 15. Like the apparatus shown in FIG. 12, the housing 27 provided with the knives 15 is driven by a hydraulic or pneumatic cylinder 21 but the knives 15 are not rocked but reciprocated along a straight line and are moved up and down under the control of the template 22 at the same time.

It will be understood that various changes in structure may be adopted within the scope of the invention. For instance, for the sake of simplicity, reference has been made in the foregoing description to the cutting of the profiled surfaces on the tread surface of skis or the like. But as has been described hereinbefore, it is also possible to cut a negative profiled surface on an embossing plate, which is then used to emboss the surface to be patterned so that it has the desired profile.

It will also be understood that numerous different combinations of depressions can be made within the scope of the invention. For instance, it is possible to form patterns in which the depressions of each row are spaced apart and adjacent rows are so staggered relative to each other that the spaces between adjacent depressions of each row are bridged by the depressions of the adjacent row.

In another pattern which may be adopted, the depressions of each row are spaced apart, the rows are not staggered, and the spaces between the depressions of each row are bridged by a small depression, which belongs to the adjacent row and connects two depressions of said adjacent row.

Finally, a pattern may be adopted in which pairs of adjacent, identical rows of depressions are provided and adjacent pairs of rows are staggered relative to each other. In such pattern the distance between adjacent ends of adjacent depressions of a given row may be equal to one-half the width of the depression.

In the foregoing description it has been stated that the pattern can be cut directly into the tread surface of a ski. In such pattern each depression increases in depth toward the forward end of the ski and terminates at an end face 3 at that end of the depression which is nearer to the forward end of the ski. Alternatively, the process according to the invention may be carried out in that the surface of an embossing plate is cut to a form which is complementary to the desired scale pattern and the embossing plate is then used to emboss the scale pattern into the tread surface of a ski or another sliding implement.

Whereas the invention is mainly intended to be applied to the formation of scales on the surface of a ski, it will be within the scope of the invention to form similar patterns on the surface of other sports implements which are intended to slide on a water surface or ground surface.

What is claimed is:

1. A process of forming a profiled tread surface on a ski, comprising repeatedly cutting into said tread surface with a cutting tool to form said surface with successive recesses which comprise sawtooth-shaped step ramps, which gently merge into the tread surface toward the rear end of the ski and are terminated by a steep end face toward the forward end of the ski, repeatedly moving said cutting tool relative to said ski between successive cutting operations in respective steps in a transverse direction which is transverse to the longitudinal direction of said surface so that the latter is formed with successive recesses in rows which extend in said transverse direction, and after the cutting of the recesses of at least one row, moving said cutting tool relative to said ski in a step in said longitudinal direction by a distance which is at least as large as the width of one of said rows, whereafter at least one additional row of said recesses is cut, the recesses of adjacent rows being staggered in said transverse direction by a fractional part of the length of each of said steps performed in said transverse direction, and adjacent rows overlapping in said longitudinal direction by a fractional part of the length of each of said steps performed in said longitudinal direction.

2. A process of forming a profiled tread surface on a ski, comprising repeatedly cutting into a surface of an embossing tool with a cutting tool to form said surface with successive negative forms of recesses, repeatedly moving said cutting tool relative to said embossing tool between successive cutting operations in respective steps in a transverse direction which is transverse to the longitudinal direction of said embossing tool so that the latter is formed with said successive negative forms of recesses in rows which extend in said transverse direction, and after the cutting of the negative forms of at least one row, moving said cutting tool relative to said embossing tool in said longitudinal direction, whereafter at least one additional row of said negative forms is cut, and using the embossing tool provided with said negative forms to emboss the tread surface of the ski so as to form sawtooth-shaped step ramps therein, which ramps merge gently into the tread surface toward one end thereof and are terminated by a steep end face toward the other end thereof, the recesses of successive transverse rows being staggered in the transverse direction of said tread surface by a distance which is a fractional part of the length of each step performed in said transverse direction of said embossing tool, and adjacent rows of recesses overlapping in the longitudinal direction of the ski by a distance which is a fractional part of the length of each step performed in the longitudinal direction of said embossing tool.

3. A process as set forth in claim 1, in which said cutting tool is rotated about an axis which is at right angles to the direction of the relative movement between said tread surface and said cutting tool, and two adjacent transverse rows are staggered in said transverse direction by one-half of the length of each step performed in said transverse direction.

* * * * *